United States Patent Office 3,817,842
Patented June 18, 1974

3,817,842
PROCESS FOR PURIFYING BROMOCHLORO-
TRIFLUOROETHANE BY AZEOTROPIC
DISTILLATION
Thomas M. Reed, Micanopy, Fla., assignor to
PCR, Inc., Gainesville, Fla.
No Drawing. Filed Apr. 26, 1973, Ser. No. 354,743
Int. Cl. B01d *3/36;* C07c *19/08*
U.S. Cl. 203—58                                    13 Claims

ABSTRACT OF THE DISCLOSURE

A process for purifying bromochlorotrifluoroethane is disclosed, wherein 1,2-dichlorohexafluorocyclobutane impurity is removed from the bromochlorotrifluoroethane by forming a maximum boiling azeotrope of the bromochlorotrifluoroethane with acetone or tetrahydrofuran and thereafter distilling, under refluxing conditions, the resulting azeotropic composition until the residue contains less than 0.01% of the dimer impurity.

Process of the present invention allows the production of halothane of improved purity, suitable for use as an anesthetic.

BACKGROUND OF THE INVENTION

1-Bromo-1-chloro-2,2,2-trifluoroethane, also known as halothane, is a known inhalation anesthetic having wide application. This compound is described in U.S. Pat. Re. 25,544, to Suckling et al.

Halothane is normally produced starting from chlorotrifluoroethylene. A single step process for producing halothane from chlorotrifluoroethylene is disclosed in Canadian Pat. 845,742 to Davis et al., wherein the chlorotrifluoroethylene is reacted with hydrogen bromide at a temperature of 70–150° C. in the presence of activated carbon and an aluminum halide.

The art has disclosed several two-step processes for producing halothane. Canadian Pat. 692,039, to Scherer et al., discloses reacting chlorotrifluoroethylene with hydrogen bromide under radical-forming conditions. The product obtained is 1,1,2-trifluoro-1-bromo - 2 - chloroethane. This compound can then be rearranged to halothane in the presence of an aluminum trihalide. Note, in this regard, U.S. Pat. 2,959,624, to Scherer et al., Canadian Pat. 650,600 to Scherer et al., and Canadian Pat. 652,239, to Scherer et al.

The synthesis of halothane may be represented by the following two reactions:

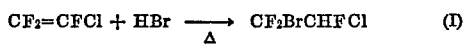

Both of the reactions set forth above are exceptionally high yield reactions. Reaction I, after crude distillation, yields 1,1,2-trifluoro-1-bromo - 2 - chloroethane in greater than 98% purity. A careful distillation of this product will reduce the impurity level to less than 0.1%.

One halothane impurity which has been particularly troublesome to remove is the dimer of chlorotrifluoroethylene, i.e., 1,2-dichlorohexafluorocyclobutane. This impurity is present in chlorotrifluoroethylene as received from manufacturers. The dimerization reaction occurs spontaneously when chlorotrifluoroethylene is stored, and also occurs during the reaction of chlorotrifluoroethylene with hydrogen bromide.

Although the dimer boils 10° C. higher than either halothane or 1,1,2-trifluoro-1-bromo-2-chloroethane, the dimer volatility is essentially equal to either of the latter compounds when in dilute solution in either of those compounds. Therefore, normal distillation techniques do not remove trace amounts of this impurity to the desired level of less than 0.01%.

The technique of azeotropic distillation has been previously used to purify various compounds. U.S. Pat. 3,720,587 to Croix discloses a process for separating halogenated ethers from halogenated ether by-products by azeotropic distillation. Maximum boiling point azeotropes of the halogenated ethers are formed with acetone, methyl ethyl ketone or tetrahydrofuran. The by-product is separated from the maximum boiling point azeotrope by distillation. Thereafter, the materials of the azeotrope may be separated by conventional steps, such as by use of water extraction to remove acetone. Other prior patents relating to the azeotropic distillation of halogenated compounds are U.S. Pats. 3,501,534 and 3,501,533, both of which also relate to the purification of halogenated ethers.

In view of the anesthetic use of halothane, the presence of even trace amounts of impurities is quite important, and, in some instances, even critical. Rigid specifications have been established for halothane, and it is desired to completely remove the dimer 1,2-dichlorohexafluorocyclobutane from halothane or its precursor.

SUMMARY OF THE INVENTION

The present invention is directed to purifying bromochlorotrifluoroethane, such as halothane, containing more than 0.01% of 1,2 - dichlorohexafluorocyclobutane, the dimer of chlorotrifluoroethylene. The method comprises the addition of at least about 25 weight percent of acetone to the impure bromochlorotrifluoroethane to form a maximum boiling azeotrope. Thereafter, the resulting mixture is distilled until the residue contains less than 0.01% of the dimer impurity.

The purification method of the present invention may be used to purify halothane directly, or it may be used to purify the halothane precursor 1,1,2-trifluoro-1-bromo-2-chloroethane.

DESCRIPTION OF THE INVENTION

It has unexpectedly been found that bromochlorotrifluoroethane can be separated from the dimer of chlorotrifluoroethylene (1,2-dichlorohexafluorocyclobutane) by azeotropic distillation with certain azeotrope-forming compounds.

According to the present invention, 1,1,2-trifluoro-1-bromo-2-chloroethane or 1-bromo-1-chloro-2,2,2-trifluoroethane (also known as halothane), can be separated from mixtures with 1,2-dichlorohexafluorocyclobutane by forming a maximum boiling azeotrope of the bromochlorotrifluoroethane with acetone or tetrahydrofuran. The resulting maximum boiling point azeotrope boils sufficiently above the boiling point of the dimer impurity to enable ready separation of the azeotrope from the dimer by distillation.

The maximum boiling point azeotrope formed by acetone and 1-bromo-1-chloro-2,2,2-trifluoroethane contains about 53 mole percent (25 weight percent) acetone and boils at a temperature of about 63° C. at atmospheric pressure.

Acetone and tetrahydrofuran appear to form a maximum boiling azeotrope with 1,1,2-trifluoro - 1 - bromo-2-chloroethane or halothane which depresses the volatility of the bromochlorotrifluoroethanes. This appears from the fact that the reflux temperature for the acetone-halothane azeotrope was observed to be 59–63° C., which is higher than the boiling points of either acetone (56.5° C.) or halothane (51° C.).

The selection of a particular agent which will form a maximum boiling azeotrope with a given compound is a highly empirical matter, as known to the art. For instance, methanol forms a minimum boiling azeotrope with bromochlorotrifluoroethane, whereas methyl ethyl ketone and ethanol do not form azeotropes with bromochlorotrifluoroethane. It is believed that acetone and tetrahydrofuran are effective in the azeotropic distillation process of the present invention because of a combined solvent effect and azeotropic effect. That is, these agents appear to form a maximum boiling azeotrope with bromochlorotrifluoroethane, which depresses the volatility of this latter compound, while increasing the activity coefficient of the dimer volatility compared to the bromochlorotrifluoroethane volatility.

In practicing the process of the present invention, bromochlorotrifluoroethane is purified, using acetone or tetrahydrofuran in an amount sufficient to form an azeotrope with a substantial portion of the bromochlorotrifluoroethane. In order to recover maximum amounts of the bromochlorotrifluoroethane, it is normally desired to combine at least enough acetone or tetrahydrofuran to azeotrope substantially all of the bromochlorotrifluoroethane to be purified. It will be appreciated, however, that the use of lesser amounts of acetone or tetrahydrofuran will, while involving greater bromochlorotrifluoroethane losses, result in the purification of some of the bromochlorotrifluoroethane. Large excesses of acetone or tetrahydrofuran can be used but are unnecessary and only serve to increase operating costs. Preferably, the acetone or tetrahydrofuran will be used in an amount of at least 25 weight percent, normally about 25–50 weight percent, based on the combined weight of acetone or tetrahydrofuran and bromochlorotrifluoroethane.

After the acetone or tetrahydrofuran has been combined with the bromochlorotrifluoroethane, containing say more than 0.01% of the dimer impurity, the dimer impurity may be easily fractionally distilled from the mixture under refluxing conditions. The residue of the bromochlorotrifluoroethane azeotrope can then be treated to separate the acetone or tetrahydrofuran to yield highly pure bromochlorotrifluoroethane suitable for use, in the form of haloethane, for anesthetic uses. The azeotrope may be treated with water to extract the acetone or tetrahydrofuran from the bromochlorotrifluoroethane but it is also possible to add water to the azeotrope and then fractionally distill the mixture to yield bromochlorotrifluoroethane of high purity. The high purity bromochlorotrifluoroethane contains less than 0.01% by weight of the dimer impurity.

The process of the present invention allows halothane to be purified of substantially all 1,2-dichlorohexafluorocyclobutane, either directly by the azeotropic distillation of the halothane or indirectly by the azeotropic distillation of the halothane precursor 1,1,2-trifluoro-1-bromo-2-chloroethane, which can then be rearranged to halothane.

EXAMPLE I

A sample of crude halothane was subjected to GLC analysis which indicated eight impurity peaks appearing before 1,1,1-trifluoro-2-bromo-2-chloroethane, with no peaks appearing after the halothane. These impurities included the dimer 1,2-dichlorohexafluorocyclobutane. A sample was distilled in a column having 30 theoretical plates, and all of the impurities appeared in the distillate samples at total reflux except the dimer.

A sample of the crude halothane, from which all of the above volatile impurities had been removed, was intentionally contaminated with about 0.65 weight percent of the dimer. Upon distillation at total reflux the head and pot samples contained 0.66 and 0.68 weight percent, respectively.

A sample of this dimer-contaminated halothane was mixed with 62 mole percent acetone (0.5 grams of acetone per gram of impure halothane). Distillation of this mixture under atmospheric pressure completely removed the dimer after about 20 volume percent of the total mixture had been removed as distillate samples. About 90 weight percent of the original halothane was recovered from the pot after washing out the acetone with water. This halothane exceeded British Pharmacopoeia specifications.

The distillate samples appeared to be about 75% acetone. About 16% of the original halothane volume was in the total of the distillate samples. The overhead material contained about 10 to 16 weight percent of dimer, on an acetone free basis, corresponding to an enrichment factor for the dimer in the distillate of about 14 to 24 times the composition of the dimer in the impure halothane.

EXAMPLE II

This example relates to the purification of 1,1,2-trifluoro-1-bromo-2-chloroethane to remove the dimer of chlorotrifluoroethylene (1,2 - dichlorohexafluorocyclobutane) therefrom.

323.0 grams of 1,1,2-trifluoro-1-bromo-2-chloroethane were placed in 300 mm. x 1" diameter glass column packed with ¼" glass helices. Tetrahydrofuran was added in 10 cc. increments to the still. After each incremental addition of tetrahydrofuran, the assembly was operated under refluxing conditions for fifteen minutes, the head and still pot temperature were noted and the next incremental addition of tetrahydrofuran was made. This procedure continued until the head temperature started to rise, at which point a slow fractionation was performed.

| | Pot temp., °C. | Head temp., °C. | Weight percent product |
|---|---|---|---|
| Total cc. of tetrahydrofuran added: | | | |
| 0 | 54 | 51 | 100 |
| 10 | 55.8 | 51.2 | 97.3 |
| 20 | 57.8 | 51.2 | 94.7 |
| 30 | 59.8 | 51.2 | 92.4 |
| 40 | 61.5 | 51.2 | 90.1 |
| 50 | 63.0 | 51.1 | 87.9 |
| 60 | 64.1 | 51.0 | 85.9 |
| 70 | 65.2 | 51.0 | 83.9 |
| 80 | 66.2 | 51.0 | 82.0 |
| 90 | 67.1 | 51.0 | 80.2 |
| 100 | 68.0 | 50.7 | 78.5 |
| 110 | 68.3 | 50.8 | 76.8 |
| 120 | 68.9 | 50.5 | 75.2 |
| 130 | 69.2 | 50.7 | 73.7 |
| 140 | 69.5 | 50.7 | 72.3 |
| 150 | 70.0 | 50.5 | 70.8 |
| 160 | 70.0 | 52.0 | 69.4 |
| 170 | 70.2 | 53.9 | 68.2 |
| 180 | 70.2 | 53.5 | 66.9 |

Numerous samples were taken during this fractionation and were combined into larger samples. Sample 1 was a combination of a number of smaller samples taken during the time the head temperature was rising from 53.5 to 67° C. and the pot temperature was rising from 70.2 to 71° C. This sample weighed 75 grams. Sample 2, weighing 54 grams, was a combination of a number of smaller samples taken during the time the head temperature rose from 67 to 69° C. with the pot temperature remaining at 71° C. Sample 3, weighing 142 grams, was the pot residue.

Samples 2 and 3 were washed with water (5× and 7× respectively) to remove tetrahydrofuran. The three samples were analyzed by GLC analysis. Sample 1 contained the dimer while samples 2 and 3 were dimer free, although the latter two samples still contained minor amounts of tetrahydrofuran and other impurities.

EXAMPLE III 5 kg. of impure 1,1,2-trifluoro-1-bromo-2-chloroethane and 5 kg. of reagent grade acetone were distilled under refluxing conditions in 1200 mm. x 1" diameter column packed with ¼" helices. Cuts were taken at about 2% wt./wt. intervals until the head temperature of 61.5° C. was reached, for a total of 28 samples amounting to 62.28% by weight of the original charge. GLC analysis indicated that the pot was free of dimer at cut 21 and the head was free of dimer at cut 24.

The dimer-free 1,1,2-trifluoro-1-bromo-2-chloroethane, which contained acetone, was washed to remove the acetone. 100 cc. of 50% wt./wt. 1,1,2-trifluoro-1-bromo-2-chloroethane/acetone was washed with 5× 100 cc. of water to produce 24 cc. of 1,1,2-trifluoro-1-bromo-2-chloroethane containing 3 weight percent acetone.

100 cc. of 50% wt./wt. 1,1,2-trifluoro-1-bromo-2-chloroethane/acetone was washed with 1× 500 cc. of water to produce 37 cc. of product, which product was then washed with 1× 100 cc. of aqueous solution of 17.35% wt./wt. of sodium bisulfite. 23 cc. of product 1,1,2-trifluoro-1-bromo-2-chloroethane containing 0.1% by weight of acetone was recovered.

100 cc. of 50% wt./wt. 1-bromo-1-chloro-2,2,2-trifluoroethane/acetone were washed with 4× 100 cc. of acidified water (pH <4) to produce 37 cc. of 1,1,2-trifluoro-1-bromo-2-chloroethane containing 8.8% by weight of acetone. These washing experiments indicate that a simple water wash and an acid wash are comparable but not too effective for removing acetone, with these procedures leaving several percent of acetone in the 1,1,2-trifluoro-1-bromo-2-chloroethane. A water wash followed by a bisulfite wash removes substantially all of the acetone, and is therefore greatly preferred.

500 grams of dimer-free 1,1,2-trifluoro-1-bromo-2-chloroethane were reacted under total reflux with 50 grams of aluminum trichloride and, after 20 minutes of reaction, the resulting product was distilled away from the reaction mixture under vacuum. The crude product was fractionated to produce 423 grams of dimer-free halothane.

EXAMPLE IV

Impure 1,1,2-trifluoro-1-bromo-2-chloroethane containing 0.25 weight percent of 1,2-dichlorohexafluorocyclobutane as the major impurity was mixed with ½ gram of acetone per gram, and was then subjected to fractional batch distillation in a 30-plate column at a reflux ratio of 20 to 1. The fractionation results are set forth below:

| Weight percent distilled: | Reflux temp., °C. | Weight percent dimer[1] in fraction |
|---|---|---|
| 0 | 57.7 | 3.20 |
| 3 | 59.0 | 0.0073 |
| 10 | 62.0 | 0.0070 |
| 16 | 62.7 | 0.0044 |
| 26 | 63.0 | 0.0047 |
| 37 | 63.0 | Nil |
| 49 | 63.0 | Nil |
| 57 | 63.0 | Nil |
| 72 | 63.0 | Nil |
| Residue | | Nil |

50% of original CF₃BrCHFCl free of dimer.

[1] Acetone free basis.

The fractionation experimnet set forth in the above table could have been halted at about 40 wt. percent material distilled, which is shortly after azeotropic conditions were attained in the distillate. About 50% of t he 1,1,2-trifluoro-1-bromo-2-chloroethane would then be recovered as dimer-free product.

EXAMPLE V

Example IV was repeated, except that the crude 1,1,2-trifluoro-1-bromo-2-chloroethane was mixed with an equal weight of acetone, with the following fractionation results:

| Weight percent distilled: | Reflux temp., °C. | Wt. percent [CF₃BrCHFCl] in distillate | Weight percent dimer[1] in pot |
|---|---|---|---|
| 0 | 56.0 | Nil | 0.25 |
| 11 | 57.0 | Nil | 0.004 |
| 25 | 58.0 | 33 | (²) |
| 30 | 61.0 | 76 | Nil |
| 36 | 62.5 | 76 | Nil |
| 42 | 62.5 | 76 | Nil |
| 51 | 62.5 | | Nil |
| Residue | | | Nil |

80% of original CF₃BrCHFCl free of dimer.

[1] Acetone-free basis.
[2] Not analyzed.

It will be appreciated that a large excess of acetone was used in this experiment. The fractions of the initial 25% by weight of material distilled were completely miscible with water and appeared to contain negligible amounts of fluorocarbons. The reflux temperature during the early portion of this experiment was essentially that of boiling acetone (56.5° C.). The fractionation could have been halted after about 30% by weight of the charge had been distilled leaving a dimer-free residue of about 40% of the original acetone in the charge and about 80% of the original 1,1,2-trifluoro-1-bromo-2-chloroethane in the charge.

What is claimed is:

1. A method of purifying bromochlorotrifluoroethane containing 1,2-dichlorohexafluorocyclobutane as impurity, said method comprising adding to said impure bromochlorotrifluoroethane an azeotroping amount of a member selected from the group consisting of acetone and tetrahydrofuran to form a maximum boiling azeotrope of said member and said bromochlorotrifluoroethane, and distilling under refluxing conditions the resulting composition containing the maximum boiling azeotrope until the residue contains less than 0.01% of said impurity.

2. The method of claim 1 wherein said bromochlorotrifluoroethane is 1-bromo-1-chloro-2,2,2-trifluoroethane.

3. The method of claim 1 wherein said bromochlorotrifluoroethane is 1-bromo-2-chloro-1,1,2-trifluoroethane.

4. The method of claim 1 wherein at least about 25 weight percent of said member is used, based on the weight of said member and the weight of said bromochlorotrifluoroethane.

5. The method of claim 4 wherein from about 25 to about 50 weight percent of said member is used.

6. The method of claim 1 wherein said member is acetone.

7. The method of claim 1 wherein said member is tetrahydrofuran.

8. An azeotrope of about 47 mole percent of bromochlorotrifluoroethane and about 53 mole percent of acetone.

9. Azeotrope of claim 8 wherein said bromochlorotrifluoroethane is 1-bromo-1-chloro-2,2,2-trifluoroethane.

10. Azeotrope of claim 8 wherein said bromochlorotrifluoroethane is 1-bromo-2-chloro-1,1,2-trifluoroethane.

11. An azeotrope of about 39 mole percent of bromochlorotrifluoroethane and about 61 mole percent of tetrahydrofuran.

12. Azeotrope of claim 11 wherein said bromochlorotrifluoroethane is 1-bromo-1-chloro-2,2,2-trifluoroethane.

13. Azeotrope of claim 11 wherein said bromochlorotrifluoroethane is 1-bromo-2-chloro-1,1,2-trifluoroethane.

References Cited

UNITED STATES PATENTS

| 2,921,098 | 1/1960 | Suckling | 260—653 |
| 2,999,815 | 9/1961 | Eiseman | 252—171 |
| 3,082,263 | 3/1963 | McGinty | 260—653 |
| 3,349,137 | 10/1967 | Cropp et al. | 260—653 |
| 3,689,373 | 9/1972 | Hutchinson | 203—58 |

WILBUR L. BASCOMB, Jr., Primary Examiner

U.S. Cl. X.R.

203—62; 252—171; 260—653 R